United States Patent [19]
Rink

[11] 3,770,023
[45] Nov. 6, 1973

[54] CONSTRICTABLE TUBE VALVE WITH ANTI-CRACKING TUBE ARRANGEMENT AND TUBE THEREFOR

[75] Inventor: Helm Arthur Rink, North Haledon, N.J.

[73] Assignee: Resistoflex Corporation, Roseland, N.J.

[22] Filed: Dec. 15, 1971

[21] Appl. No.: 208,279

[52] U.S. Cl. .................................. 138/121, 251/8
[51] Int. Cl. ........................................... F16l 11/00
[58] Field of Search ................. 138/121, 46, 108, 138/118, 119; 251/7, 8, 4

[56] References Cited
UNITED STATES PATENTS

| | | | |
|---|---|---|---|
| 2,212,733 | 8/1940 | Grigsby | 251/8 |
| 2,342,192 | 2/1944 | Grigsby | 251/8 |
| 3,436,054 | 4/1969 | Cole et al. | 251/8 |
| 3,624,800 | 11/1971 | Swick | 138/118 X |
| 3,204,919 | 9/1965 | Tripoli et al. | 251/8 |

Primary Examiner—George E. Lowrance
Assistant Examiner—Steven M. Pollard
Attorney—Elmer R. Helferich et al.

[57] ABSTRACT

An internal circumferential rib is provided on the inner surface of a tube of inelastic crack sensitive resin. The side edges of the tube coinciding with the rib are clamped in folded condition to establish fluid seals thereat. Compressor members effect selective constriction of the remainder of the tube between the clamped edges to provide valving action in a constrictable tube valve. Provision of the rib prevents the development of through-the-wall cracks.

7 Claims, 6 Drawing Figures

CONSTRICTABLE TUBE VALVE WITH ANTI-CRACKING TUBE ARRANGEMENT AND TUBE THEREFOR

DISCLOSURE

The present invention relates to the constrictable tube utilized in a valve of the type which mechanically flattens such tube to form a barrier to the flow of material therethrough. More specifically, the invention is directed to a solution to the problem of crack formation in the wall of the constrictable tube during use when such tube is fabricated from a substantially inelastic and crack sensitive material.

In the copending application of Irving D. Press, Ser. No. 126,436, filed Mar. 22, 1971, for "Constrictable Tube Valve" and assigned to the same assignee as the present application, there is disclosed and claimed a constrictable tube valve of novel construction. As described in said copending application, clamps disposed at opposite sides of a tube of polytetrafluoroethylene (PTFE) resin or other crack sensitive material maintain regions at each side of the tube in constantly constricted fluid sealing condition free from crack inducing flexure secured in sealing embrace about a smoothly curving filler piece. A pair of compressor members cooperate with the edge clamped tube to provide a constrictable tube valve wherein the crack sensitive material of the tube will not be induced to crack upon valve manipulation. The valve disclosed in said copending application employs a simple tube generally of uniform wall thickness relying upon the edge clamps and the filler piece for maintaining the side edges of the tube in constantly constricted condition without inducing through-the-wall cracks therein. The present invention is directed to an alternative arrangement for preventing through-the-wall cracks from being developed in a crack sensitive tube which is subjected to repeated constriction.

While the aforesaid copending application describes an arrangement which avoids the formation of cracks by not subjecting the tube material to crack inducing stress, the present invention provides a tube of special configuration whereby the propagation of a crack is directed or controlled such that, although cracking is not totally precluded, through-the-wall cracking does not occur.

In accordance with one aspect of the present invention there is provided, in a valve of the type in which a constrictable tube is mechanically flattened to form a barrier to the flow of fluid material therethrough, the improvement comprising: a constrictable tube having a flexible wall and an internal circumferential rib; means disposed at opposite sides of the tube for maintaining a region at each side coinciding with the rib in constantly constricted fluid sealing condition; and mechanical compressor means for adjustably constricting the remainder of the tube coinciding with the rib between the regions for controlling the closing of the valve.

The invention will be better understood after reading the following detailed description of a presently preferred embodiment thereof with reference to the appended drawings in which.

The same reference numerals are employed throughout the various figures of the drawings to designate the same or similar parts.

Figure 1:
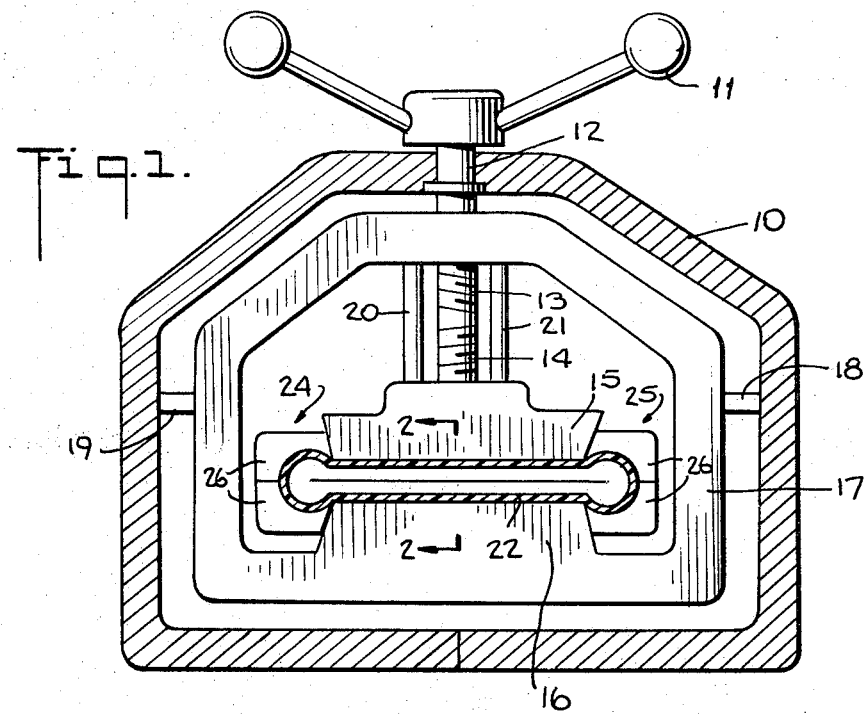
FIG. 1 is a transverse sectional view showing the basic elements of a constrictable tube valve employing a constrictable tube formed in accordance with the present invention.

Referring now to the drawings, the basic components of the valve are shown in FIG. 1. The valve construction may take the same form, except for the tube configuration, as the valve disclosed in the aforesaid copending application to which reference may be had for a more detailed description. As seen in FIG. 1 hereof, the valve consists of a housing 10 which is formed in two halves divided longitudinally and bolted together in a manner not shown. A valve handle 11 enables manipulation of a valve stem 12 having oppositely threaded zones 13 and 14. An upper compressor member 15 is threadedly engaged with the threaded zone 14 of the valve stem 12 while a lower compressor member 16 formed integral with a yoke 17 is threadedly engaged with the threaded zone 13 of valve stem 12. Restraining pins 18 and 19 engage the yoke 17 for preventing rotation thereof within the housing 10. Guide pins 20 and 21 restrain the upper compressor member 15 from rotating relative to the yoke 17. The arrangement is such that when the valve handle 11 is manipulated in the valve opening direction, usually counterclockwise, the compressor members 15 and 16 move in opposite directions away from each other to permit the tube element 22, confined therebetween, to expand and permit fluid therethrough. Reverse manipulation of the valve handle 11 causes the compressor members 15 and 16 to approach each other and thereby close the valve.

Figure 2:
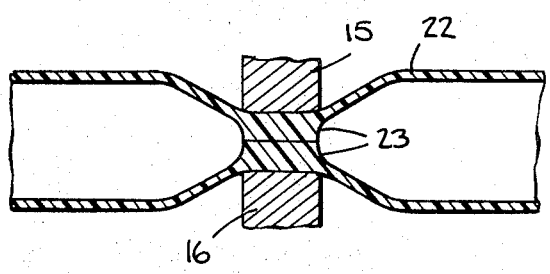
FIG. 2 is a fragmentary sectional view taken along the line 2—2 in FIG. 1.
Figure 3:
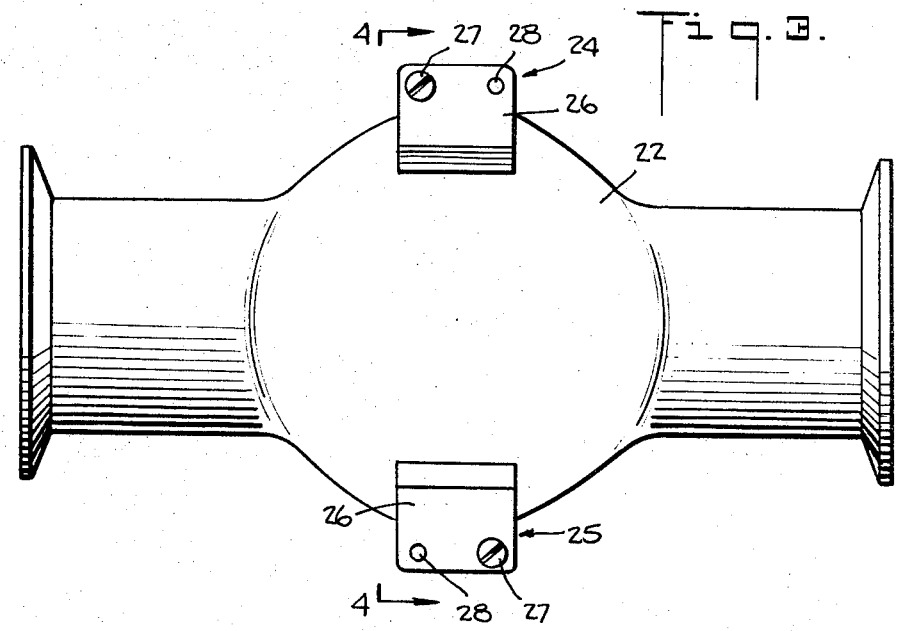
FIG. 3 is a plan view of the constrictable tube employed in the valve of FIG. 1 with the edge clamps installed but prior to installation in the valve assembly.
Figure 4:
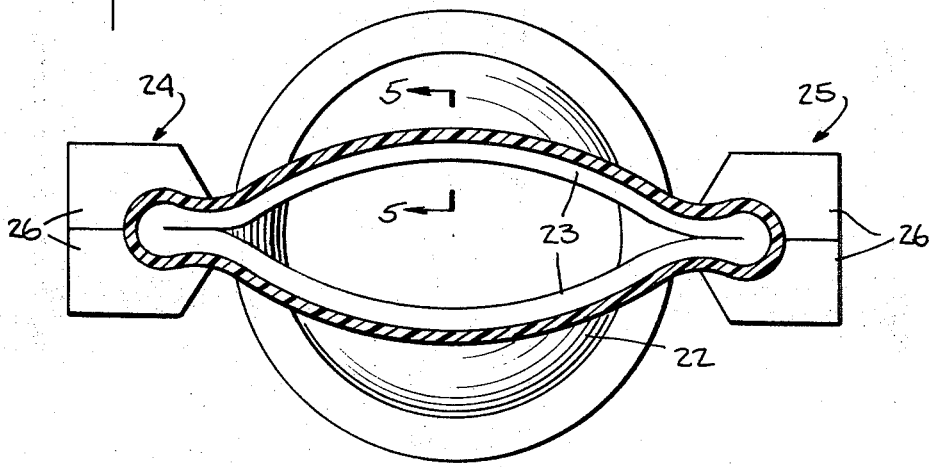
FIG. 4 is a transverse sectional view taken along the line 4—4 in FIG. 3.
Figure 5:
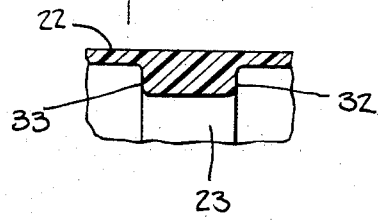
FIG. 5 is a fragmentary sectional view taken along the line 5—5 in FIG. 4.

As best seen in FIGS. 2, 4 and 5 of the drawings, the constrictable tube 22 employed in the valve of the present invention is provided with an internal circumferential rib 23 intermediate the ends of the tube and preferably near its center. The ends of the tube are suitably flared as shown in FIG. 3.

In a manner somewhat similar to that described in the aforesaid copending application, the opposite side edges of the tube 22 are maintained in constantly constricted condition by the edge clamps 24 and 25 located coincident with or overlying the internal rib 23. Each edge clamp 24 and 25 is composed of two identical clamp halves 26. Two screws 27 and 28 inserted from opposite sides secure the halves 26, 26 together, as shown. The individual clamp halves may be constructed substantially the same as those illustrated in greater detail in the aforesaid copending application. However, it will be understood that the internal configuration of the surface embracing the tube wall may be slightly different in order to accommodate the tube with internal rib rather than the simple tube with a filler piece.

Figure 6:
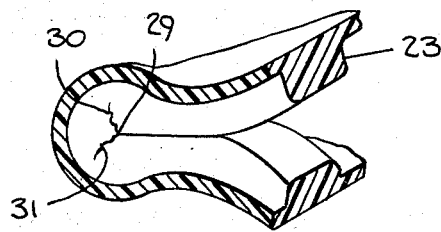
FIG. 6 is an enlarged fragmentary view showing the nature of crack development and control in the tube wall as constructed in accordance with the invention.

As best seen in FIG. 6, when the tube 22 constructed in accordance with the present invention is constricted at its edge a crease line occurs at the point 29 at the radially inner surface of rib 23 running longitudinally of the tube. As will be readily apparent, maximum stresses are localized at the crease line at point 29 and cracks such as those represented at 30 and 31 may develop. Due to the provision of the internal rib 23 such cracks originate at the inner wall of such rib. Propagation naturally tends to occur in a longitudinal direction relative to the axis of the tube rather than in a radial direction. However, longitudinal propagation of a crack such as those shown at 30 and 31 is interrupted when the side walls 32 and 33 of the rib (best seen in FIG. 5) are encountered. The main wall of the tube is under less stress and free from crack inducing folds. Thus, through-the-wall cracks do not materialize.

It should also be apparent from a consideration of FIGS. 1 and 4 that the normal flexing of the tube during opening and closing of the valve will not produce in the tube wall any further crack inducing bends. It will also be seen from FIG. 2 that the compressor members overlie or coincide with the rib and bring the rib surfaces together to close the valve.

The present invention is particularly well suited to the production of valves employing a constrictable tube formed from PTFE or similar inelastic crack sensitive resin. A tube from such material may be formed with an internal rib either by machining from a thick wall tube structure or by isostatic molding or similar molding technique. It should also be apparent to those skilled in the art that the actual cross sectional configuration of the rib as seen in FIGS. 2 and 5 may be varied while still relying upon the principles implicit in the present disclosure.

Having described a presently preferred embodiment of the invention it should be understood that various changes may be made therein without departing from the true spirit of the invention as defined in the appended claims.

What is claimed is:

1. In a valve of the type in which a constrictable tube is mechanically flattened to form a barrier to the flow of fluid material therethrough, the improvement comprising: a constrictable tube having a flexible wall and an internal rib extending around the entire circumference thereof; means disposed at opposite side edges of said tube for maintaining a region at each side edge coinciding with said rib in constantly constricted fluid sealing condition; and mechanical compressor means for adjustably constricting the remainder of the tube coinciding with said rib between said regions for controlling the closing of said valve.

2. A valve according to claim 1, wherein said means disposed at opposite side edges of said tube comprises at each side edge a clamping device disposed on the exterior of said tube, said clamping device being constructed and arranged to constrict the side edge of said tube sufficiently to crease the radially inner surface of said rib developing a fluid seal thereat.

3. A valve according to claim 2, wherein said tube consists essentially of a fluorocarbon resin.

4. A valve according to claim 3, wherein said resin is polytetrafluoroethylene.

5. A constrictable tube for use in a valve wherein the tube is mechanically flattened to form a barrier to the flow of fluid material therethrough, said tube having a flexible wall and an internal rib extending around the entire circumference thereof located intermediate its ends, the material of said tube being substantially inelastic and crack sensitive but such that when regions at each side edge of said tube coinciding with said rib are folded and restrained in fluid sealing condition, the remainder of the tube coinciding with said rib between said regions is capable of being constricted for closing said valve without causing the development of a through-the-wall crack.

6. A constrictable tube according to claim 5, wherein said material consists essentially of a fluorocarbon resin.

7. A constrictable tube according to claim 6, wherein said material consists essentially of polytetrafluoroethylene.

* * * * *